July 17, 1928.
H. C. DRAKE
1,677,177
ELECTRIC TOASTER
Filed Jan. 2, 1926
2 Sheets-Sheet 1
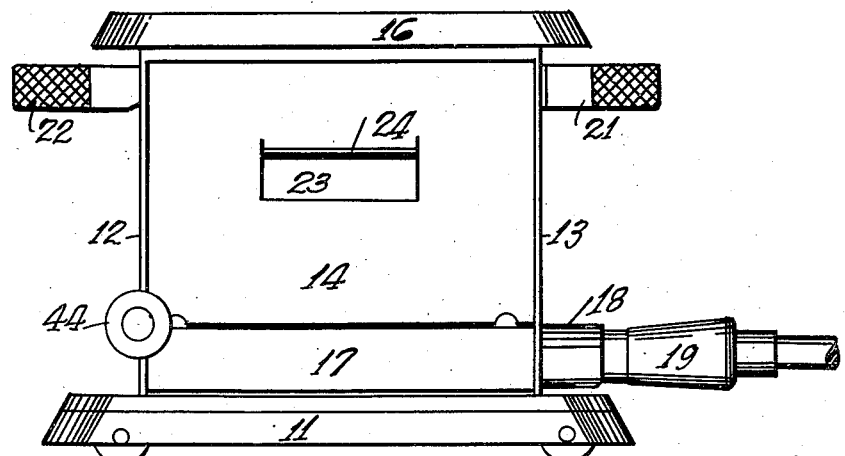
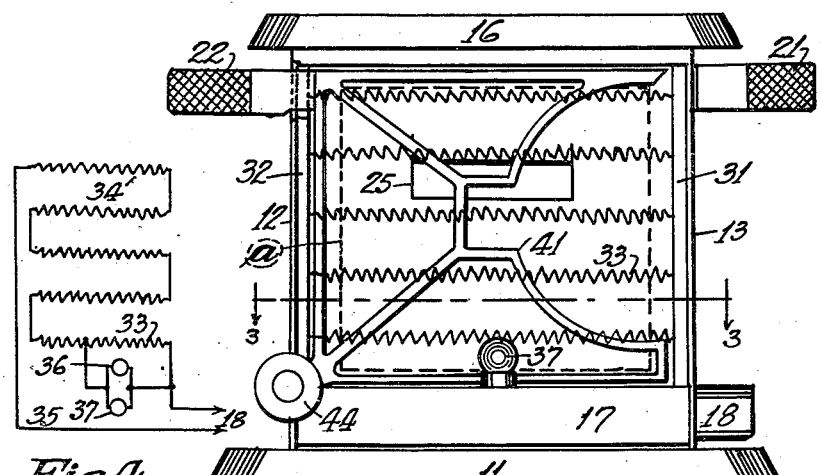
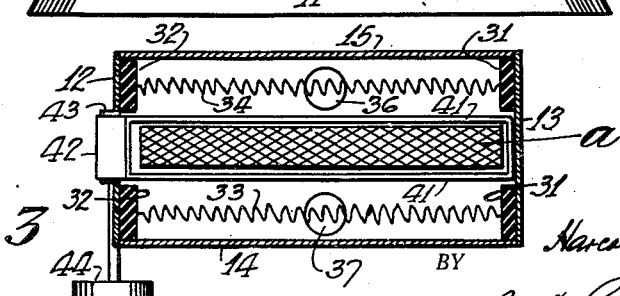
INVENTOR.
Harcourt C. Drake
BY
M. H. Laughridge
ATTORNEY.

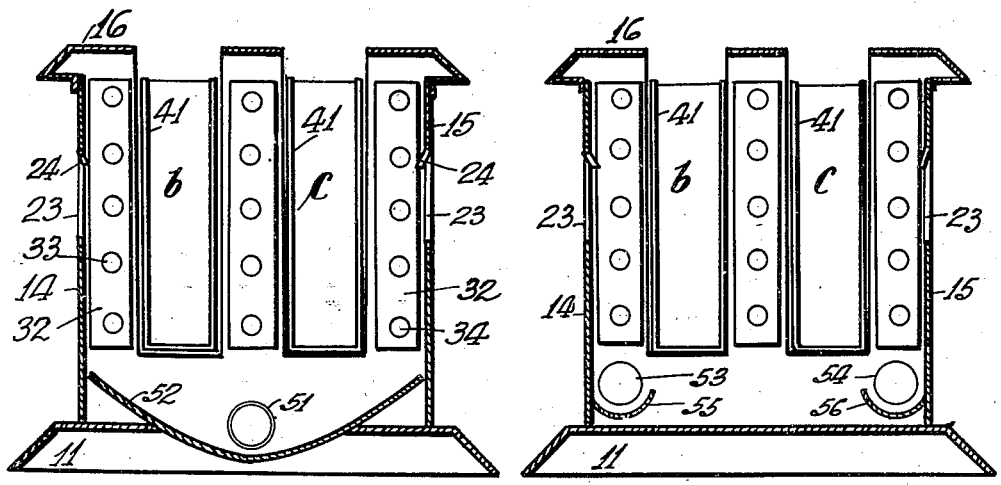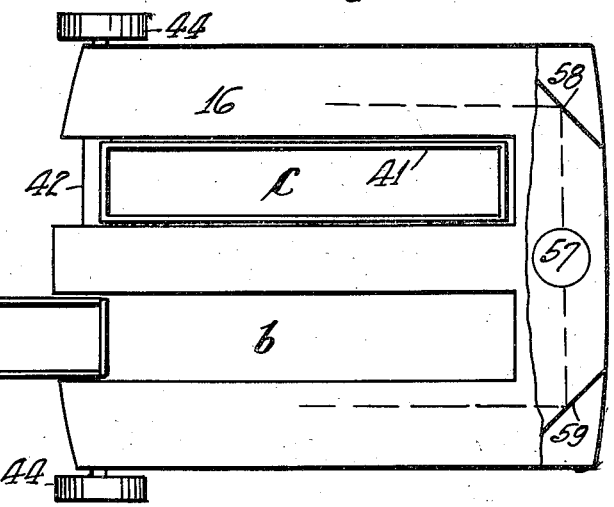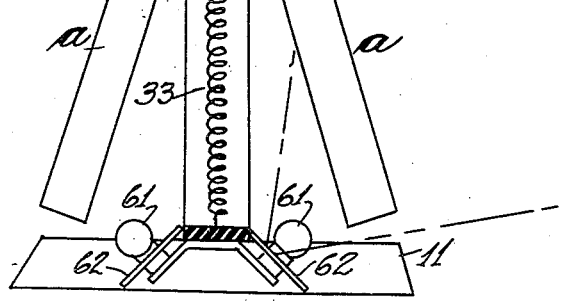

Patented July 17, 1928.

1,677,177

UNITED STATES PATENT OFFICE.

HARCOURT C. DRAKE, OF HEMPSTEAD, NEW YORK.

ELECTRIC TOASTER.

Application filed January 2, 1926. Serial No. 79,022.

This invention relates to an electric toaster of the type commonly used for toasting bread and it has for an object to embody in the toaster a source of illumination for illuminating the surface of the bread as it is toasted so that the extent of the toasting can readily be determined. Other objects of the invention reside in the details of construction and arrangement of parts as more particularly described in the following specification and shown in the accompanying drawings, in which, Fig. 1 is a side elevation of an enclosed type of toaster embodying my invention, Fig. 2, is another side elevation with one of the side covers removed to show the interior, Fig. 3 is a sectional plan view of Fig. 2 showing the arrangement of the parts of the device, Fig. 4 shows one arrangement of circuits that may be used with this invention, Fig. 5 is an end elevation, in section, showing another arrangement of my invention applied to a toaster with a plurality of toasting chambers, Fig. 6 is another end elevation, in section, of a double chambered toaster embodying a modified form of my invention, Fig. 7 is a top plan view of a double chambered toaster showing another arrangement of my invention, and Fig. 8 is another modification.

In electric toasters as commercially manufactured at the present time it is difficult to determine the extent of the toasting unless one is very close to the object and in the enclosed type of toasters the extent of the toasting can be ascertained only when the bread is removed from the toaster. The present invention provides a source of illumination associated with the electric heating unit of the toaster which illuminates the surface that is being toasted and enables the extent of the toasting to be determined in the dark or in a dull light and to be readily determined at a distance from the toaster. In the type of toasters which are enclosed as shown in the drawings, a window is provided in the side covers through which the illuminated surface may be inspected. This window may be an open space, or may be covered with some transparent material such as mica when an open space is undesirable. The invention includes a pivoted cradle for carrying the bread and means for turning this cradle on its pivot away from the heating elements and making the bread accessible.

In Fig. 1, 11 is the base of a toaster of a popular type, 12 and 13 are the end plates, 14 and 15 are the side plates and 16 is the top. The electric conductors are led from the plug 19 to the receptacle 18 and are distributed in the bottom section 17. Handles 21 and 22 may be provided as shown at either end and preferably covered with a heat insulating material so that the device can be moved by these handles and the projecting handles help to guard objects from coming into contact with the hot toaster. The side plate 14 is provided with a window at 23 and the opposite side plate has a corresponding window 25, Fig. 2. The edge of the window may be deflected as at 24 to enlarge the view through the opening.

Strips of insulation 31 and 32 are secured to the end plates and the heating coils 33 and 34 extend between and are supported by these strips. An electric bulb 36, Fig. 3 is provided at one side of the device below the heating coils and another electric bulb 37 is provided at the opposite side below the other set of heating coils. These bulbs are, preferably, of low voltage, that is, of lower voltage than the voltage used in the heating coil and are connected in multiple circuit with a portion of the coil as indicated in Fig. 4. From this figure it will be noted that the heating coils are connected in series with the return circuit on wire 35.

The bread in the toasting position is indicated by $a$ in Fig. 3 and is indicated in dotted outline in Fig. 2. A cradle 41 supports the slice of bread between the two rows of heating coils. This cradle is pivoted at the bottom corner at 42 to the lugs 43 in the end plate and is rotated on its pivot by the knob 44. The end and the top of the device is suitably slotted to permit the movement of the cradle on its pivot. The handle 22 is preferably, formed integral with the cradle thus forming an additional means for moving the cradle while this handle forms a rest for the outer end of the cradle when it is turned away from the toaster.

From the arrangement described it will be noted that when the toaster is in operation the bulbs 36 and 37 are illuminated and thus both sides of the bread slice are illuminated and the progress of the toasting can be observed through the windows 23 or 25. Without this illumination, the bread is enclosed in a dark space and it is not possible through the windows to determine the extent of the toasting.

The toaster in Fig. 5 is constructed with three sets of heating coils and two toasting chambers and with one source of illumination in the bulb 51, which, by means of the reflector 52 illuminates the outside chambers so that outer surfaces of the bread can be observed through the windows in the side plates. It will be noted that the central section between the toasting chambers is illuminated so that if only one slice of bread is toasting in this device both of its sides can be observed through the side windows. In the construction of toasters of this type the heating coils are usually so proportioned that an equal toasting effect is obtained on both sides of the bread and thus it is necessary only to observe the progress of the toasting on one side of the bread.

The construction in Fig. 6 is similar to Fig. 5 except that two bulbs are used for illumination, the bulb 53 with the reflector 55 being placed under one outside chamber and the bulb 54 with the reflector 56 being placed under the other outside chamber.

In Fig. 7 the illumination is obtained, as indicated by the section where the cover is removed, by a bulb placed centrally at the end as 57 and by reflectors 58 and 59 which reflect the light from this bulb to the exterior chambers of the device, similar to the illumination of the other types and at the same time the central chamber is directly illuminated from the bulb.

In the type of toasters which have a central heating chamber enclosed by the slices of bread which are toasted on the inside and which cannot readily be inspected, the arrangement shown in Fig. 8 may be used in carrying out my invention. In this construction the heating coil 33 is placed in the centre between the bread slices a—a. At the base a reflector 62 is provided which can be seen at a distance, the base being deformed opposite the reflector for this purpose, this reflector is inclined at an angle to reflect the inner surface of the bread as it is being toasted and as it is illuminated by the bulb 61 conveniently supported by the base, the bulb being inserted in an aperture in the reflector to engage a supporting bracket as shown. It is apparent that in this construction one or two bulbs placed on the centre between the heating coils will satisfactorily illuminate both slices of bread.

Other alternative arrangements can readily be adapted in applying this invention whereby the progressive process of toasting bread can be followed by means of the illumination provided without departing from the intent and spirit thereof.

Having thus described my invention, I claim:

1. In a portable bread toaster as described, the combination of a stand having an electric outlet, an electric heating coil connected with said outlet and a source of illumination, said source connected in multiple circuit with a portion of said coil and arranged to illuminate the surface of the bread being toasted by said coil.

2. In a bread toaster as described, the combination of a stand having an electric outlet, a toaster comprising a heating coil connected with said outlet, a cradle for the bread being toasted, a source of illumination and an elongated reflector on said stand, said reflector being so arranged as to illuminate the surface of the bread being toasted from said source of illumination.

3. In a bread toaster as described, the combination of a stand having an electric outlet, a toaster comprising heating coils connected with said outlet, a cradle and electric light bulbs on said stand, said cradle pivoted to rotate between said heating coils and said bulbs connected in multiple circuit with a portion of said coils and arranged to illuminate said cradle.

4. In a bread toaster as described, the combination of a toaster including a supporting stand with an electric outlet and a heating coil connected with said outlet with means for supporting the bread to be toasted in relation to said heating coil and means supported by said stand and associated with said heating coil for illuminating the surface of the bread as it is being toasted.

5. In a bread toaster as described, the combination, a stand having an electric outlet connected with a source of electric supply, an electric heating coil connected with said outlet and an electric bulb for illuminating the bread being toasted, said bulb being of lower voltage than said supply and connected in multiple circuit with a portion of said coil having a voltage drop corresponding substantially to the voltage of the bulb.

Signed at New York in the county of New York and State of New York this 15th day of December A. D. 1925.

HARCOURT C. DRAKE.